(12) United States Patent
Choi et al.

(10) Patent No.: US 8,922,394 B2
(45) Date of Patent: Dec. 30, 2014

(54) APPARATUS AND METHOD FOR PARKING POSITION DISPLAY OF VEHICLE

(71) Applicant: Hyundai Motor Company, Seoul (KR)

(72) Inventors: Jae Seob Choi, Gyeonggi-do (KR); Dae Joong Yoon, Gyeonggi-do (KR); Eu Gene Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 13/847,210

(22) Filed: Mar. 19, 2013

(65) Prior Publication Data

US 2014/0132423 A1    May 15, 2014

(30) Foreign Application Priority Data

Nov. 9, 2012  (KR) .................. 10-2012-0126691

(51) Int. Cl.
| | | |
|---|---|---|
| G08G 1/14 | (2006.01) | |
| B60Q 9/00 | (2006.01) | |
| B62D 15/02 | (2006.01) | |
| G01S 15/93 | (2006.01) | |
| G01S 13/93 | (2006.01) | |

(52) U.S. Cl.
CPC .............. *B60Q 9/006* (2013.01); *B62D 15/027* (2013.01); *G01S 15/931* (2013.01); *B62D 15/0285* (2013.01); *G01S 2013/9314* (2013.01)
USPC .......................... 340/932.2; 340/939; 340/990

(58) Field of Classification Search
USPC .............. 340/932.2, 937, 938, 935, 939, 940, 340/942–943, 990, 991–994, 995.1, 995.11, 340/995.14, 995.17, 995.27, 995.28
See application file for complete search history.

(56) References Cited

U.S. PATENT DOCUMENTS

| | | | |
|---|---|---|---|
| 2005/0083212 A1* | 4/2005 | Chew ......................... | 340/932.2 |
| 2007/0075875 A1* | 4/2007 | Danz et al. ................ | 340/932.2 |
| 2008/0033647 A1* | 2/2008 | Milark et al. ................ | 701/300 |
| 2009/0174574 A1* | 7/2009 | Endo et al. ................. | 340/932.2 |
| 2010/0118140 A1* | 5/2010 | Iwakiri et al. ................ | 348/135 |
| 2011/0013201 A1* | 1/2011 | Scherl et al. ................ | 356/628 |
| 2011/0116717 A1* | 5/2011 | Lee ............................... | 382/199 |

FOREIGN PATENT DOCUMENTS

| | | |
|---|---|---|
| JP | 2010247557 A | 11/2010 |
| JP | 2011016401 A | 1/2011 |
| JP | 2011180688 A | 9/2011 |
| KR | 10-2008-0004832 | 1/2008 |
| KR | 20080109871 A | 12/2008 |
| KR | 10-2011-0054146 | 5/2011 |
| KR | 10-2012-0086576 | 8/2012 |

* cited by examiner

*Primary Examiner* — Daniel Previl
(74) *Attorney, Agent, or Firm* — Edwards Wildman Palmer LLP; Peter F. Corless

(57) ABSTRACT

Disclosed is an apparatus and a method for parking position display of a vehicle. The apparatus includes a processor configured to detect objects around a vehicle by analyzing sensor values obtained by a distance sensor that is installed in the vehicle and surrounding images captured by imaging devices that are disposed in the vehicle. The processor is also configured to locate the detected objects based on the sensor values and the surrounding images. Additionally, the processor is configured to control display elements corresponding to the detected objects to be output on the surrounding images based on the positions of the detected objects.

18 Claims, 8 Drawing Sheets

APPARATUS AND METHOD FOR PARKING POSITION DISPLAY OF VEHICLE

CROSS-REFERENCE TO RELATED APPLICATION

This application is based on and claims priority from Korean Patent Application No. 10-2012-0126691, filed on Nov. 9, 2012 in the Korean Intellectual Property Office, the disclosure of which is incorporated herein in its entirety by reference.

BACKGROUND

1. Field of the Invention

The present invention relates to an apparatus and a method for displaying the parking position of a vehicle, and more particularly, to a technology for displaying display elements corresponding to objects in the vicinity of the vehicle on a topview image.

2. Description of the Prior Art

The parking control function of vehicles allows users to select a parking area by detecting and displaying empty areas or objects in the vicinity of the vehicles through a monitor or the like.

The monitor or the like is configured to display a topview image composed from the images taken around the vehicles. Although it is possible to determine the existence of an object due to a large distortion of the image which is generated in changing the view of the topview image, it is difficult to determine the type of object. Further, empty areas are blocked due to distortion of objects displayed on the topview image, causing difficulty in detecting empty areas using only the topview image.

SUMMARY

Accordingly, the present invention provides an apparatus and a method for displaying the parking position of a vehicle which allows substantially accurate detection of objects by detecting objects from a sensor value of a distance sensor and the result of analysis of surrounding images.

The present invention further provides an apparatus and a method for displaying the parking position of a vehicle which increases a recognition rate of objects in the vicinity of the vehicle from a topview image distorted by correction by displaying display elements corresponding to the objects in the vicinity of the vehicle on the topview image.

Furthermore the present invention provides an apparatus and a method for displaying the parking position of a vehicle which increases a recognition rate of empty areas in the vicinity of the vehicle by temporarily storing the images of empty areas without image distortion and by substituting the temporarily stored images of the empty areas for the images of empty areas with image distortion later.

In one embodiment the present invention provides an apparatus for parking position display of a vehicle including: an object detecting unit configured to detect objects around a vehicle by analyzing sensor values obtained by a distance sensor in the vehicle and surrounding images captured by imaging devices in the vehicle; an object locating unit configured to locate the detected objects based on the sensor values and the surrounding images; and an output control unit configured to control display elements corresponding to the detected objects to be output on the surrounding images based on the positions of the detected objects.

The object detecting unit may be configured to detect corresponding objects in the surrounding images based on the information of the detected objects from the obtained sensor values. Furthermore, the object detecting unit may be configured to set recognition areas for the objects based on the information of the detected objects from the obtained sensor values. The object locating unit may be configured to determine the positions of the detected objects and locations of the detected objects on the surrounding images based on the positions of the detected objects.

The apparatus may further include an empty area recognizing unit configured to recognize empty areas around the vehicle by analyzing the sensor values obtained from the distance sensor in the vehicle and the imaging devices in the vehicle. The output control unit may be configured to temporarily store the images of the recognized empty areas in the surrounding images and substitute the temporarily stored images of the empty areas for the images of empty areas which are distorted by the objects on the surrounding images.

When a parking area is selected, the object detecting unit may detect objects in a parking path area by searching the surrounding images of the parking path for the selected parking area. The surrounding images may be topview images obtained by integrating at least two or more surrounding images capturing at different positions. The display element may include at least one of an image or an to icon of the object.

Another embodiment of the present invention provides a method of parking position display of a vehicle including: detecting, by a processor, objects around a vehicle by analyzing sensor values obtained by a distance sensor disposed in the vehicle and surrounding images captured by imaging devices disposed in the vehicle; locating, by the processor, the detected objects based on the sensor values and the surrounding images; and controlling display elements corresponding to the detected objects to be output on the surrounding images based on the positions of the detected objects.

The detecting of objects around a vehicle may further include detecting, by the processor, corresponding objects in the surrounding images based on the information of the detected objects from the obtained sensor values. The detecting of objects around a vehicle may further include setting, by the processor, set recognition areas for the objects based on the information of the detected objects from the obtained sensor values.

The locating of objects may further include determining, by the processor, the positions of the detected objects and locations of the detected objects on the surrounding images based on the positions of the detected objects.

The method may further include recognizing, by the processor, empty areas around the vehicle by analyzing the sensor values obtained from the distance sensor in the vehicle and the imaging devices in the vehicle.

The method may further include: temporarily storing, by the processor, images of the recognized empty areas; and substituting, by the processor, the temporarily stored images of the empty areas for images of the empty areas which are distorted by the objects in the surrounding images. When a parking area is selected, the detecting of objects may further include detecting, by the processor, objects in a parking path area by searching the surrounding images of the parking path for the selected parking area. The surrounding images may be topview images obtained by integrating at least two or more surrounding images taken at different positions. The display element may include at least one of an image or an icon of the object.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

Figure 1:
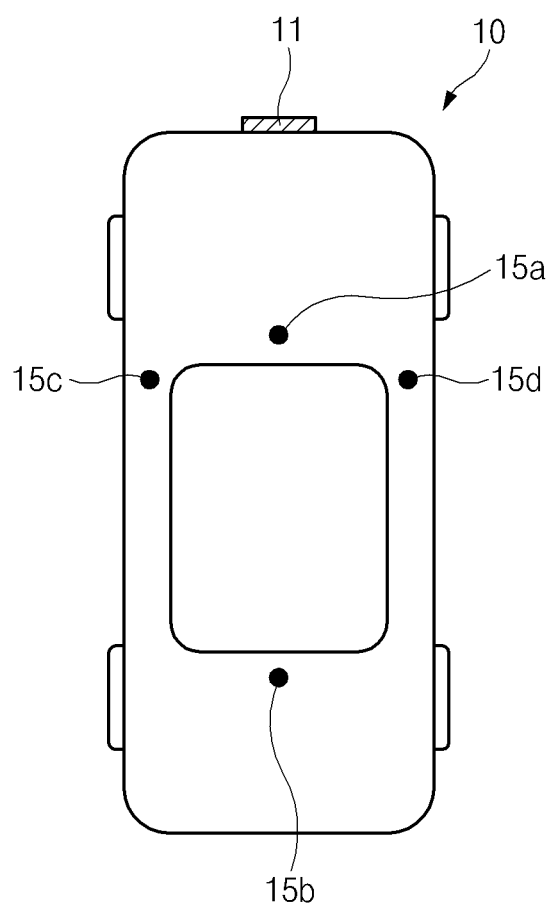
FIG. 1 is an exemplary view showing a vehicle equipped with an apparatus for displaying the parking position of a vehicle according to an exemplary embodiment of the present invention.

FIG. 1 is an exemplary view showing a vehicle equipped with an apparatus for displaying the parking position of a vehicle according to an exemplary embodiment of the present invention. Referring to FIG. 1, a vehicle 10 equipped with an apparatus for displaying the parking position of a vehicle may be configured to measure the distances from objects, using a distance sensor 11 mounted on the vehicle. The sensor value for the distance measured by the distance sensor 11 may be transmitted to an apparatus for displaying a parking position (not shown) mounted on the vehicle 10 and used for detecting objects and empty areas.

Although FIG. 1 shows that the distance sensor 11 may be disposed at the front of the vehicle 10, the placement is merely an example and the distance sensor 11 may be disposed at another location within the vehicle 10.

The vehicle 10 equipped with the apparatus for displaying a parking position may be equipped with a plurality of imaging devices 15a, 15b, 15c, and 15d to capture images of the vicinity of the vehicle. The surrounding images captured by the imaging devices 15a, 15b, 15c, and 15d on the vehicle 10 may be transmitted to the apparatus to display a parking position in the vehicle 10 and may be used to detect objects and empty areas and display the parking position. Although the imaging devices 15a, 15b, 15c, and 15d are disposed at the front, rear, left, and right of the vehicle 10, they may be disposed at least one of the front, rear, left, and right of the vehicle 10.

Figure 2:
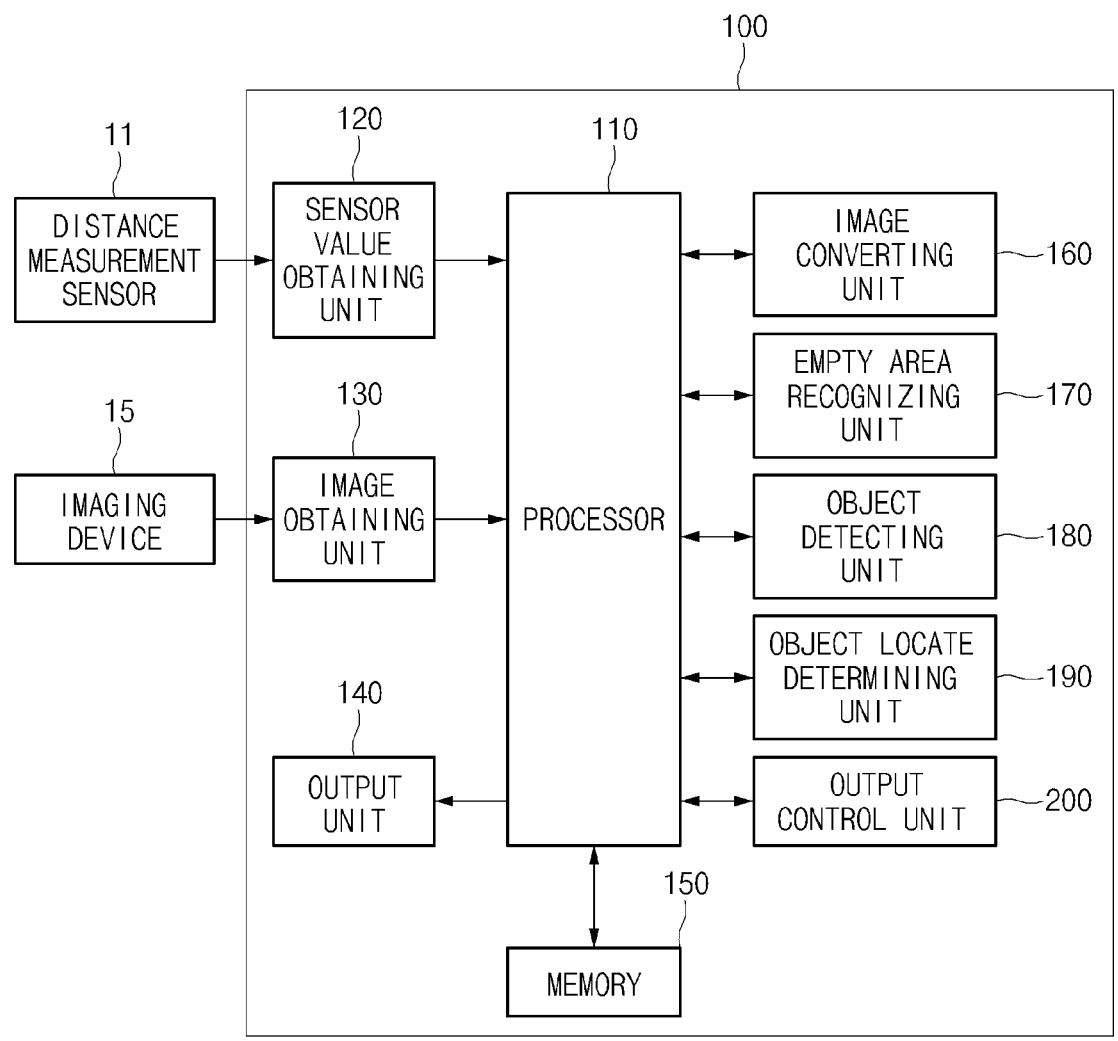
FIG. 2 is an exemplary block diagram illustrating the configuration of an apparatus for displaying the parking position of a vehicle according to an exemplary embodiment of the present invention.

FIG. 2 is an exemplary block diagram illustrating the configuration of the apparatus for displaying the parking position of a vehicle according to an exemplary embodiment of the present invention.

Referring to FIG. 2, an apparatus 100 for displaying a parking position according to an exemplary embodiment of the present invention includes an imaging device 15, a distance measurement sensor 11, and a plurality of units executed by a processor 110 within a controller having a memory 150. The plurality of units may include a sensor value obtaining unit 120, an image obtaining unit 130, an output unit 140, an image converting unit 160, an empty area recognizing unit 170, an object detecting unit 180, an object locating unit 190, and an output control unit 200.

The sensor value obtaining unit 120 may be connected with the distance sensor 11 on the vehicle and may be configured to obtain the sensor values sensed by the distance sensor 11. The distance sensor 11 may be an ultrasonic sensor, a radar, or a rider and the sensor values obtained by the sensor value obtaining unit 120 are the distance from objects surrounding the vehicle.

The image obtaining unit 130 may be connected with the imaging device 15 and may be configured to obtain surrounding images captured by the imaging device 15. The imaging device 15 may include the plurality of imaging devices disposed at the front, rear, left, and right of the vehicle and the image obtaining unit 130 may be configured to obtain the surrounding images captured by the imaging devices at the front, rear, left, and right of the vehicle. On the other hand, when the vehicle is equipped with an AVM system, the image obtaining unit 130 may be connected with the AVM system and may be configured to obtain a topview image produced by the AVM system.

The output unit 140 may be configured to output the results of detecting the operational status of the apparatus 100 and objects, or empty areas. Further, the output unit 140 may be configured to output an image of a parking position when the vehicle is traveling or parked. Although the output unit 140 may be configured to output signals to a connected display unit, the output unit 140 may be a display unit. Any type of display unit that is capable of displaying images such as the images on a monitor or a navigation device may be applied.

The memory 150 maybe configured to store setting values for operating the apparatus 100 and may be configured to store the sensor values obtained by the sensor value obtaining unit 120 and the images obtained by the image obtaining unit 130. Further, the memory 150 may be configured to store the result of detecting objects and empty areas, the information on the positions of objects, and an image of a parking position.

The image converting unit 160 may be configured to convert the surrounding images obtained by the image obtaining unit 130 into topview images and may be configured to convert the topview images into one topview image by integrating the topview images. When the image obtaining unit 130 obtains topview images from an AVM system, the image converting unit 160 may be eliminated.

The empty area recognizing unit 170 may be configured to recognize empty areas around the vehicle by analyzing the sensor values obtained by the distance sensor 11 in the vehicle and the topview image converted by the image converting unit 160, or topview images obtained by an AVM system. The empty area recognizing unit 170 may further be configured to recognize the locations of the empty areas and the locations of the empty areas in the topview image.

The object detecting unit 180 may be configured to detect objects in the vicinity of the vehicle by analyzing the sensor values and the topview images obtained from the distance sensor in the vehicle.

Furthermore, the object detecting unit 180 may be configured to detect the objects corresponding to the objects in the topview image based on the information regarding the objects detected from the obtained sensor values. In addition, the object detecting unit 180 may be configured to set the recognition areas for objects based on the information regarding the objects detected from the obtained sensor values, and may detect the objects corresponding to the set recognition areas. In particular, the recognition areas may be limited by the sensor values, to reduce the time required to detect the objects from the topview image. Further, the object locating unit 190 may be configured to determine locations of objects based on the sensor values and the topview image. The object locating unit 190 may additionally be configured to determine the positions of the detected objects and locate the objects in the topview image based on the positions of the detected objects.

The output control unit 200 may be configured to output control signals for controlling the output of display elements corresponding to the detected objects on the topview image based on the positions of the detected objects to the output unit 140. In particular, a user may detect objects from the display elements, despite distortion of the objects in the topview image.

Figure 4A:
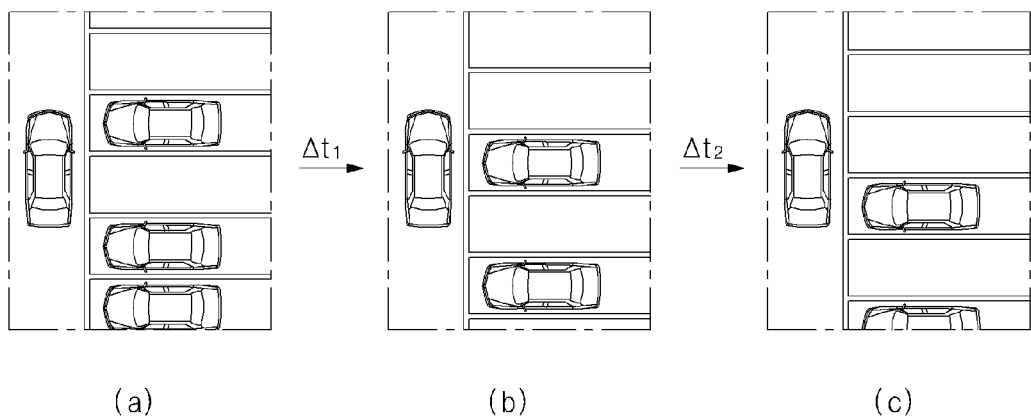
FIGS. 4A and 4B are exemplary diagrams illustrating the operation of displaying a parking position according to an exemplary embodiment of the present invention.

It is assumed herein that the display elements include at least one of the images and icons of objects. However, although icons corresponding to objects are displayed on the topview image in the exemplary embodiment of the present invention, the present invention is not limited thereto. Refer to FIGS. 4A to 5 for exemplary embodiments of displaying display elements corresponding to objects on a topview image.

On the other hand, when an empty area is recognized by the empty area recognizing unit 170, the output control unit 200 may be configured to control the image of the empty area recognized on the topview image to be temporarily stored in the memory 150. When an empty area with distortion due to an object in the topview image is detected, the output control unit 200 maybe configured to substitute the image of the empty area temporarily stored in the memory 150 for the distorted image of the empty area. Thus, the user may detect empty areas blocked by objects in the topview image.

Figure 3A:
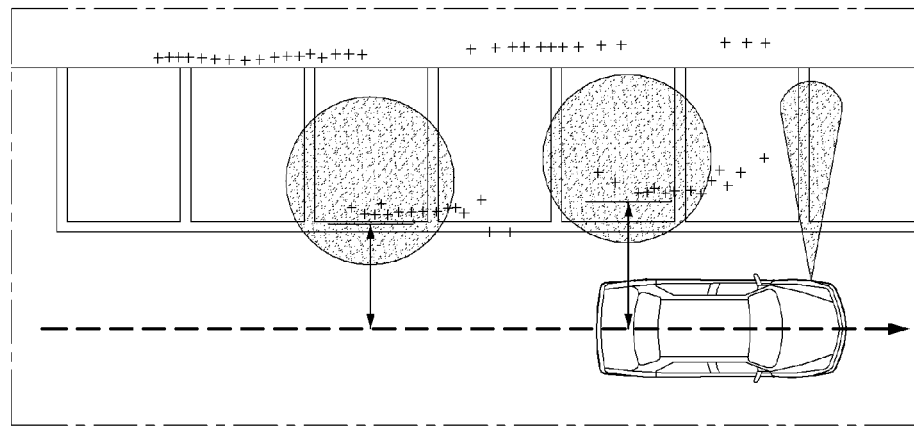
FIGS. 3A to 3C are exemplary diagrams illustrating an apparatus for displaying the parking position of a vehicle according to an exemplary embodiment of the present invention.
Figure 3B:
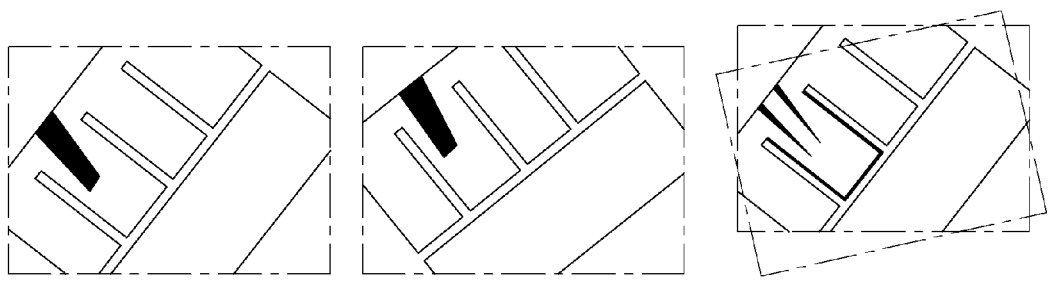
Figure 3C:
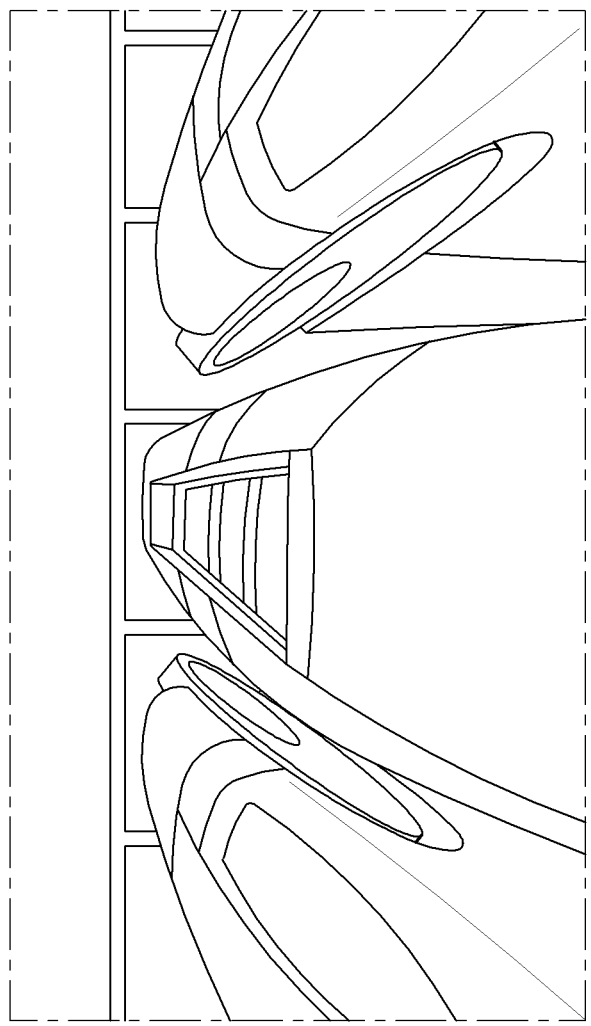

FIGS. 3A to 3C are exemplary views showing an apparatus for displaying the parking position of a vehicle according to an exemplary embodiment of the present invention. FIG. 3A shows an exemplary embodiment of detecting an object by measuring the distance from the object around a vehicle, using a distance sensor in the vehicle. The apparatus for displaying a parking position may be configured to set a recognition area for detecting an object based on the distance value measured by the distance sensor. Additionally, FIGS. 3B and 3C show exemplary embodiments of recognizing on object based on a surrounding image captured by an imaging device on a vehicle. In particular, the apparatus for displaying a parking position may be configured to detect an object from a difference image of two surrounding images captured with a predetermined time interval or may be configured to detect an object by matching templates or determining the left-right symmetry. It should be understood that other various methods may be used for detecting objects from measured distance values and surrounding images.

Figure 4B:
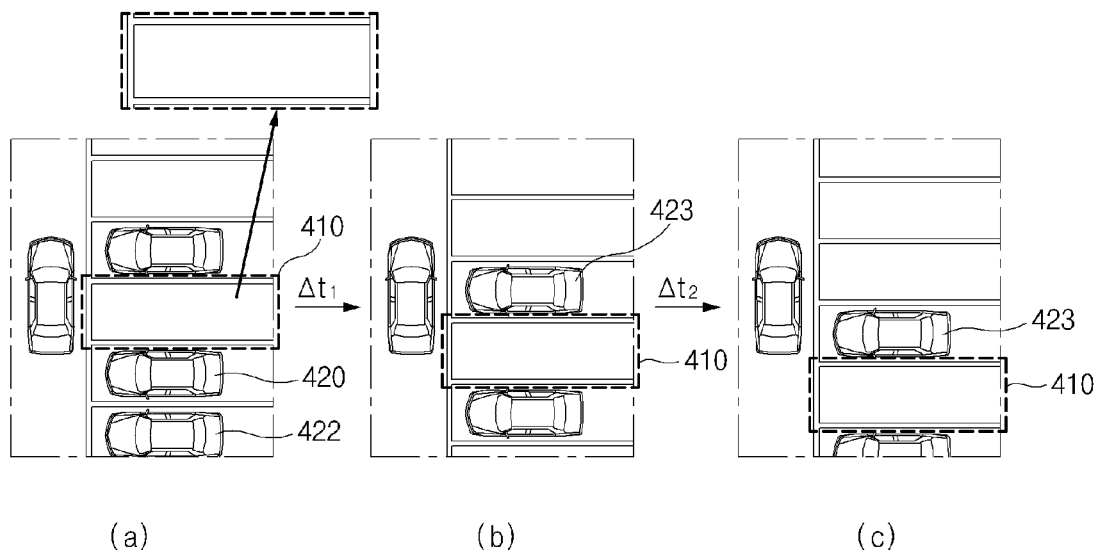
Figure 5:
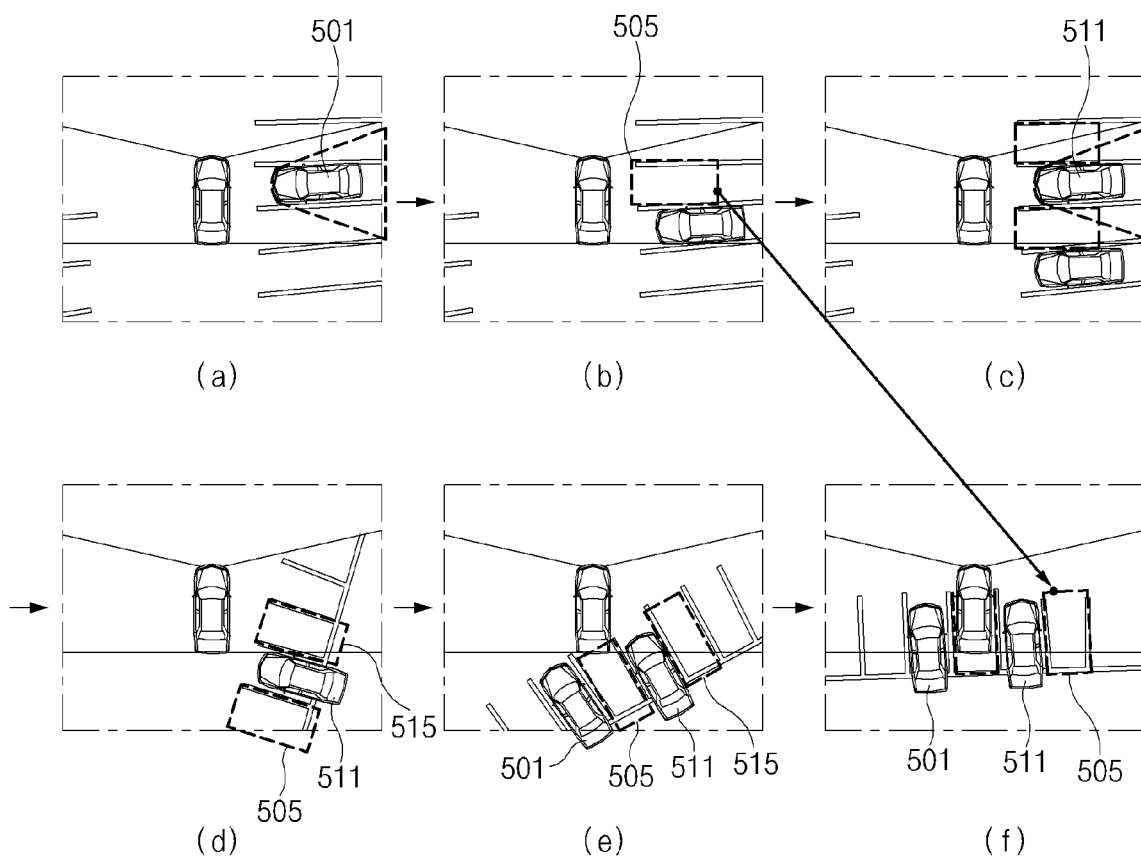
FIG. 5 shows exemplary diagrams illustrating the operation of displaying a parking position according to another exemplary embodiment of the present invention.

FIGS. 4A and 4B are exemplary views illustrating the operation of displaying a parking position according to an exemplary embodiment of the present invention. FIG. 4A shows original topview images obtained from the surrounding areas of a vehicle in accordance with the present invention. As shown in FIG. 4A, objects may be detected and located from the original topview images that change as time passes, however the type of object may not be detected due to image distortion. Further, as in (b) of FIG. 4A, an empty area may be blocked by an object, thus an empty area may not be detected from the original topview images. On the other hand, FIG. 4B shows topview images with icons of objects and images of empty areas on the original topview images shown in FIG. 4A. As shown in FIG. 4B, the apparatus may be configured to display a parking position positions icons 420 and 422 for the objects detected from (a), that is, vehicles on a topview image and may temporarily store an image 410 of an empty area which is not distorted by the objects.

Thereafter, the apparatus for displaying a parking position may be configured to substitute the image 410 of the empty area which is temporarily stored in (a) of FIG. 4B for the distorted image of the empty area in the original topview image in (b) of FIG. 4A. Further, the apparatus may be configured to arrange the icon 423 of the vehicle newly detected from (b) of FIG. 4B at the corresponding position on the topview image. Therefore, the positions of the objects and the position of the empty area may be distinguished from (b) of FIG. 4B. The apparatus may further be configured to arrange the same icon 423 and the image 410 of the empty area for the vehicle and the empty area previously detected from (b) of FIG. 4B, when the position of the vehicle changes as in (c).

FIG. 5 shows exemplary views illustrating the operation of displaying a parking position according to another exemplary embodiment of the present invention. In particular, FIG. 5 shows an exemplary embodiment of displaying a parking position when parking a vehicle into a selected parking area. Referring to FIG. 5, in (a) to (c), similar to FIG. 4B, icons 501 and 511 of detected vehicles are arranged at the corresponding positions on topview images and the distorted image of an empty area is substituted by a temporarily stored image 505 of the empty area.

When a parking area is selected and a vehicle begins to park in the parking area, the apparatus for displaying a parking position may be configured to determine, by the processor, the parking path of the vehicle and detect objects and empty areas by searching the areas in the vicinity of the parking path.

When a vehicle is detected from the area in the parking path, the apparatus may be configured to arrange, by the processor, the icon 511 for the detected vehicle at a corresponding position on the topview image and substitute the temporarily stored image 505 of the empty area for the distorted image of the empty area. Therefore, a display element 515 may be arranged to highlight the empty area, for example using a line, for a user to determine the position of the empty area, even for an area without images of empty areas distorted.

When the positions of vehicles change as in (e) and (f) of FIG. 5, a user may detect the positions of objects and empty areas during parking, by arranging the icons 501 and 511 corresponding to the detected vehicles, the image (505) of the empty area, and the display element 515 highlighting the empty area on the topview image with the positions of the vehicles changed.

The operation flow in the apparatus for displaying a parking position having the configuration according to an exemplary embodiment of the present invention, is described hereafter in more detail.

Figure 6:
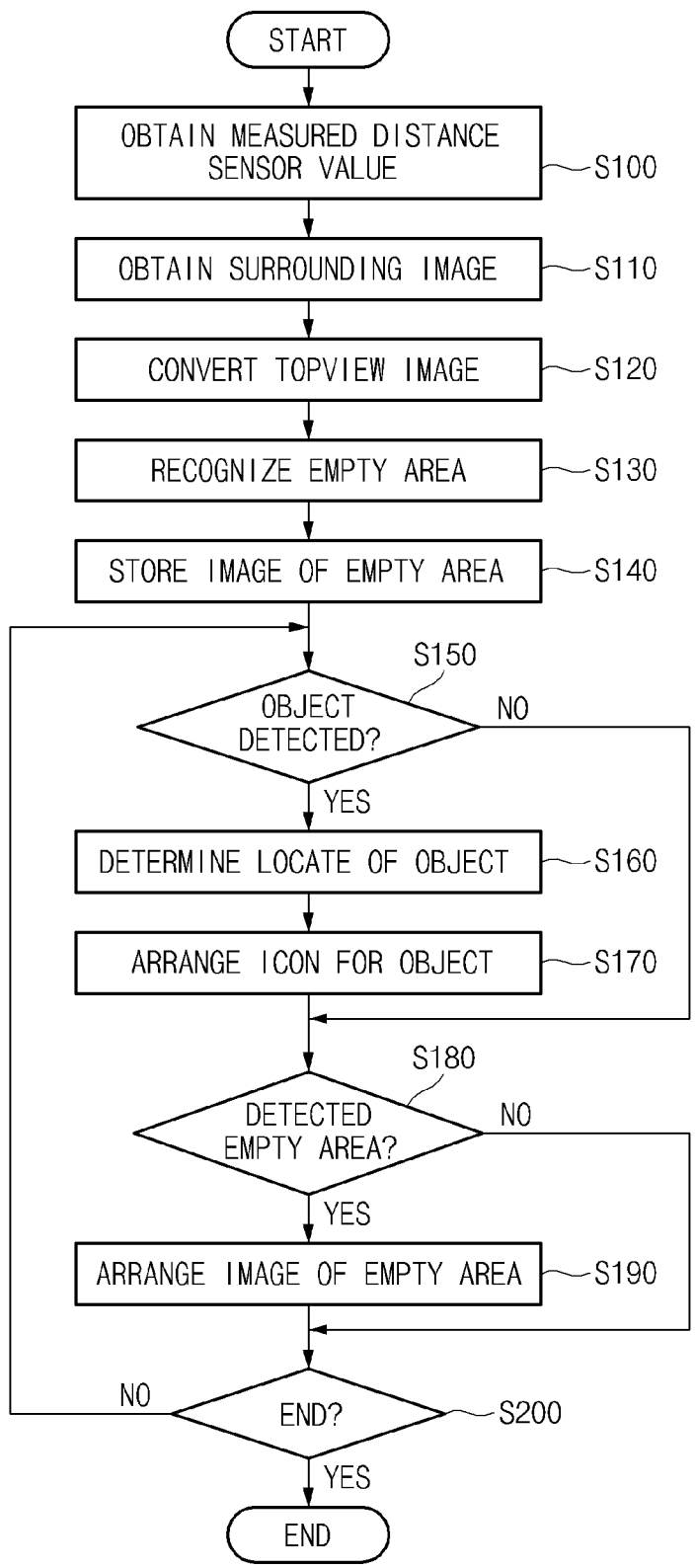
FIGS. 6 and 7 are exemplary flowcharts illustrating the operation flow of a method of displaying a parking position according to an exemplary embodiment of the present invention.
Figure 7:
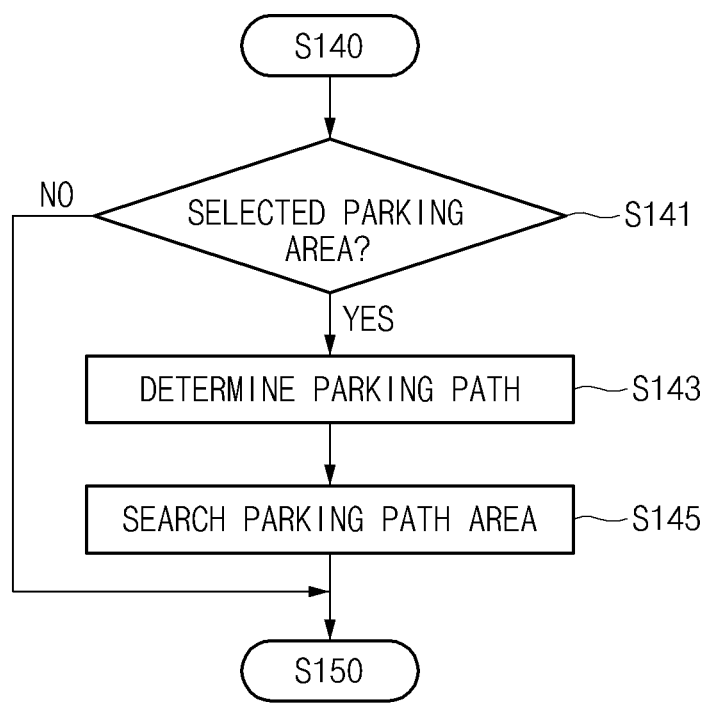

FIGS. 6 and 7 are exemplary flowcharts illustrating the operation flow of a method of displaying a parking position according to an exemplary embodiment of the present invention.

Referring to FIG. 6, an apparatus for displaying a parking position according to an exemplary embodiment of the present invention may obtain, by a processor, distance sensor values measured by a distance sensor in a vehicle (S100) and obtain, by the processor, a surrounding image captured by at least one imaging device disposed in the vehicle (S110), to display a parking position. The apparatus for displaying a parking position may convert, by the processor, at least one surrounding image obtained in S110 into a composite topview image (S120).

The apparatus may recognize, by the processor, empty areas around the vehicle by analyzing the distance sensor values obtained in S110 and the topview image produced in S120 (S130). When recognizing an empty area, the apparatus may store, by the processor, the image of the empty area on the topview image (S140).

Further, when detecting an object around the vehicle by analyzing the distance sensor values obtained in S100 and the topview image produced in S120, the apparatus may locate, by the processor, the object detected in S150 (S160) and arrange an icon for the object detected in S150 on the topview image produced in S120 (S170). Additionally, when detecting an empty area (S180), particularly, when detecting an empty area distorted by an object on the topview image, the apparatus may output, by the processor, to a user a topview image with a non-distorted image of the empty area, by arranging the image of the empty area stored in S140 on the image of the empty area detected in S180.

The apparatus may repeated the process from S150 to S190 until a specific command for end is input to the processor, and may complete the relating operations, when an end command is input (S200) to the processor.

On the other hand, referring to FIG. 7, when a parking area to park a vehicle is selected after the process of S140 in FIG. 6 (S141), the apparatus may determine, by the processor, the parking path for the parking area with respect to the current position of the vehicle (S143) and search a parking path area for the parking path determined in S143 (S145). Furthermore, the apparatus may arrange, by the processor, icons corresponding to objects detected from the parking path area and the images of empty areas on the topview image to allow a user to complete parking of the vehicle, by performing the process after S150 in FIG. 6.

According to the present invention, objects may be substantially accurately detected by detecting the objects using the result of analyzing sensor values from a distance sensor and surrounding images, and the time required to recognize objects by setting recognition areas from the measured distance sensor values and detecting objects in the set recognition areas may be reduced.

Further, according to the present invention, the rate of recognizing objects around a vehicle from a topview image distorted due to correction may be increased by displaying display elements corresponding to objects around the vehicle, on the topview image, and the rate may be increased for recognizing empty areas around a vehicle by temporarily storing images of the empty areas without image distortion and substituting the temporarily stored images of the empty areas for images with image distortion of the empty areas.

As described above, although an apparatus and a method for displaying the parking position of a vehicle according to the present invention were described with reference to the accompanying drawings, the present invention is not limited to the exemplary embodiments described herein and the accompanying drawings and may be modified within the protection range of the scope of the present invention.

What is claimed is:

1. An apparatus for parking position display of a vehicle, comprising:
   a distance sensor installed in the vehicle and configured to measure distance between the vehicle and a plurality of objects;
   a plurality of imaging devices disposed in the vehicle and configured to capture a plurality of surrounding images of the vehicle;
   a processor configured to:
   detect a plurality of objects around the vehicle by analyzing sensor values obtained from the distance sensor and the surrounding images captured by imaging devices;
   locate the detected objects based on the sensor values and the surrounding images;
   control a plurality of display elements corresponding to the detected objects to be output on the surrounding images based on the positions of the detected objects;
   temporarily store, in the surrounding images, the images of a plurality of recognized empty areas in the vicinity of the vehicle; and
   substitute the temporarily stored images of the empty areas for the images of empty areas which are distorted by the objects on the surrounding images.

2. The apparatus according to claim 1, wherein the processor is further configured to:
   detect corresponding objects in the surrounding images based on the information of the detected objects from the obtained sensor values.

3. The apparatus according to claim 2, wherein the processor is further configured to:
set a plurality of recognition areas correlating to the detected objects based on the information of the detected objects from the obtained sensor values.

4. The apparatus according to claim 1, wherein the processor is further configured to:
determine the positions of the detected objects and locations of the detected objects on the surrounding images based on the positions of the detected objects.

5. The apparatus according to claim 1, wherein the processor is further configured to:
recognize the plurality of empty areas in the vicinity of the vehicle by analyzing the sensor values obtained from the distance sensor and the imaging devices.

6. The apparatus according to claim 1, wherein the processor is further configured to:
detect the plurality of objects in a parking path area by searching the surrounding images of the parking path for the selected parking area, when a parking area is selected.

7. The apparatus according to claim 1, wherein the surrounding images are topview images obtained by integrated at least two or more surrounding images captured at different positions.

8. The apparatus according to claim 1, wherein the display element includes at least one of an image and an icon of the object.

9. A method of parking position display of a vehicle, comprising:
detecting, by a processor, a plurality of objects around the vehicle by analyzing sensor values obtained by a distance sensor disposed in the vehicle and a plurality of surrounding images captured by a plurality of imaging devices disposed in the vehicle;
locating, by the processor, the detected objects based on the sensor values and the surrounding images;
controlling, by the processor, a plurality of display elements corresponding to the detected objects to be output on the surrounding images based on the positions of the detected objects;
temporarily storing, by the processor, a plurality of images of a plurality of recognized empty areas in the vicinity of the vehicle; and
substituting, by the processor, the temporarily stored images of the empty areas for images of the empty areas which are distorted by the objects.

10. The method according to claim 9, wherein the detecting of the plurality of objects around a vehicle further includes:
detecting, by the processor, corresponding objects in the surrounding images based on the information of the detected objects from the obtained sensor values.

11. The method according to claim 10, wherein the detecting of the plurality of objects around a vehicle further includes:
setting, by the processor, a plurality of recognition areas for the objects based on the information of the detected objects from the obtained sensor values.

12. The method according to claim 9, wherein the locating of the detected objects further includes:
determining, by the processor, the positions of the detected objects and locations of the detected objects on the surrounding images based on the positions of the detected objects.

13. The method according to claim 9, further comprising:
recognizing, by the processor, the plurality of empty areas in the vicinity of the vehicle by analyzing the sensor values obtained from the distance sensor and the plurality of imaging devices.

14. The method according to claim 9, wherein the detecting of the plurality of objects around the vehicle further includes:
detecting, by the processor, a plurality of objects in a parking path area by searching the surrounds of the parking path for a selected parking area, in response to a parking being selected.

15. The method according to claim 9, wherein the surrounding images are topview images obtained by integrating at least two or more surrounding images captured at different positions.

16. The method according to claim 9, wherein the display element includes at least one of an image and an icon of the object.

17. A non-transitory computer readable medium containing program instructions executed by a processor, the computer readable medium comprising:
program instructions that detect a plurality of objects around a vehicle by analyzing sensor values obtained by a distance sensor disposed in the vehicle and a plurality of surrounding images captured by a plurality of imaging devices disposed in the vehicle;
program instructions that locate the detected objects based on the sensor values and the surrounding images;
program instructions that control a plurality of display elements corresponding to the detected objects to be output on the surrounding images based on the positions of the detected objects;
program instructions that temporarily store, in the surrounding images, the images of a plurality of recognized empty areas in the vicinity of the vehicle; and
program instructions that substitute the temporarily stored images of the empty areas for the images of empty areas which are distorted by the objects on the surrounding images.

18. The non-transitory computer readable medium of claim 17, further comprising:
program instructions that recognize the plurality of empty areas in the vicinity of the vehicle by analyzing the sensor values obtained from the distance sensor and the plurality of imaging devices.

* * * * *